United States Patent [19]

Ramanathan

[11] Patent Number: 4,581,445
[45] Date of Patent: Apr. 8, 1986

[54] CATIONIC BENZOTHIAZOLE DISAZO COMPOUNDS

[75] Inventor: Visvanathan Ramanathan, Basel, Switzerland

[73] Assignee: Ciba-Geigy Corporation, New York, N.Y.

[21] Appl. No.: 533,531

[22] Filed: Sep. 16, 1983

[30] Foreign Application Priority Data

Sep. 23, 1982 [CH] Switzerland ............... 5622/82

[51] Int. Cl.$^4$ ............... C09B 35/025; C09B 35/031; C09B 35/037; C09B 35/34
[52] U.S. Cl. ............... 534/608; 534/589; 534/590; 534/591; 534/599; 534/600; 534/693; 534/727; 534/728; 534/758; 534/788
[58] Field of Search ............... 534/608, 758, 727, 728, 534/693

[56] References Cited

U.S. PATENT DOCUMENTS

| | | | |
|---|---|---|---|
| 3,271,383 | 9/1966 | Yamaya et al. | 534/608 |
| 3,707,532 | 12/1972 | Artz et al. | 260/158 |
| 3,822,247 | 7/1974 | Ozutsumi et al. | 260/157 |

FOREIGN PATENT DOCUMENTS 1206717  9/1970  United Kingdom ............... 534/758

OTHER PUBLICATIONS

Chemical Abstracts, vol. 89 (1978) No. 148139k (Aleksandrova et al).

*Primary Examiner*—Floyd D. Higel
*Attorney, Agent, or Firm*—Wenderoth, Lind & Ponack

[57] ABSTRACT

There are described novel cationic benzothiazole disazo compounds of the formula

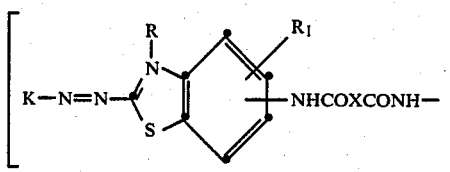

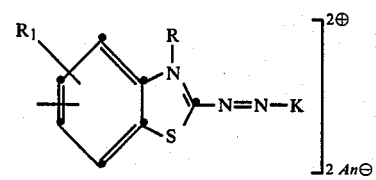

K independently of one another are each a coupling component,
R independently of one another are each an unsubstituted or substituted $C_1$–$C_4$-alkyl group,
$R_1$ independently of one another are each hydrogen, unsubstituted or substituted $C_1$–$C_4$-alkyl, unsubstituted or substituted $C_1$–$C_4$-alkoxy, or halogen,
X is the direct bond, —$(CH_2)_y$— wherein y is a number from 1 to 4, —CH=CH—, a phenylene group, a naphthylene group, a heterocyclic radical, an —NH-alkylene-($C_1$–$C_6$)—NH— radical or an —NH-arylene-NH— radical, and
An is an anion, with the proviso that when the coupling component K is a dimethylaminophenyl radical, the divalent bridge member X is not the —$(CH_2)_2$— group are useful for dyeing and printing textile materials, leather and in particular paper. The dyeings obtained have good fastness properties, especially good fastness on paper to light.

7 Claims, No Drawings

CATIONIC BENZOTHIAZOLE DISAZO COMPOUNDS

The invention relates to novel cationic disazo compounds, to processes for producing them, and to their use as dyes for dyeing and printing textile materials, leather and in particular paper.

The novel cationic disazo compounds correspond to the formula I

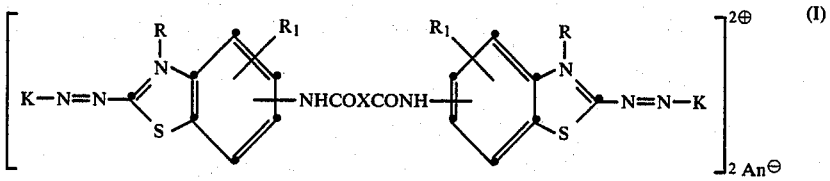

wherein
- K independently of one another are each a coupling component,
- R independently of one another are each an unsubstituted or substituted $C_1$-$C_4$-alkyl group,
- $R_1$ independently of one another are each hydrogen, unsubstituted or substituted $C_1$-$C_4$-alkyl, unsubstituted or substituted $C_1$-$C_4$-alkoxy, or halogen,
- X is the direct bond, $-(CH_2)_y-$ wherein y is a number from 1 to 4, $-CH=CH-$, a phenylene group, a naphthylene group, a heterocyclic ring, an $-NH-$alkylene-($C_1$-$C_6$)$-NH-$ radical or an $-NH$-arylene-NH$-$ radical, and
- An is an anion, with the proviso that when the coupling component K is a dimethylaminophenyl radical, the divalent bridge member X is not the $-(CH_2)_2-$ group.

Preferred cationic disazo compounds correspond to the formula I wherein each K has the same meaning as the other K, each R the same meaning as the other R, and each $R_1$ the same meaning as the other $R_1$, and wherein the $-NHCOXCONH-$ bridge is in the p-position with respect to the N atom of the benzothiazole group, and X in the case of a phenylene group is a 1,3- or 1,4-phenylene group.

As a coupling component, K can be for example: the radical of an acetoacetic acid anilide, of a phenol, of tetrahydroquinoline, benzomorpholine, or a pyridone, quinolone, pyrazolone, aminopyrazole, indole, aniline, aminopyridine, naphthol, naphtholcarboxylic acid anilide, naphthylamine, aminothiazole and thiophene coupling component. These radicals can be substituted for example by: $C_1$-$C_4$-alkyl groups ($-CH_3$, $-C_2H_5$, n-$C_3H_7$, iso-$C_3H_7$, $-CH_2NH_2$, $-C_2H_4OH$, $-C_2H_4Cl$), $C_1$-$C_4$-alkoxy groups ($-OCH_3$, $-OC_2H_5$, n-$OC_3H_7$, iso-$OC_3H_7$, $-OC_2H_4OH$, $-OC_2H_4Cl$), or halogen (F, Cl, Br), $NO_2$, OH, CN and/or N(alkyl)$_2$, such as

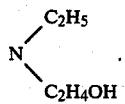

In the preferred cationic disazo compounds, the symbol K denotes the radical of aniline, tetrahydroquinoline, benzomorpholine or indoline.

As a $C_1$-$C_4$-alkyl group, R is a straight-chain or branched-chain alkyl group, such as the methyl, ethyl, n- or isopropyl group or the n-, sec- or tert-butyl group. These groups can be substituted, for example by OH, halogen such as fluorine, chlorine or bromine, by $CONH_2$ or by phenyl. In the preferred disazo compounds, R is a $C_2H_4CONH_2$, $-CH_2-CHOH-CH_3$, $-C_2H_4OH$ or $-CH_3$ group.

As a $C_1$-$C_4$-alkyl group, $R_1$ is a straight-chain or branched-chain alkyl group, such as the methyl, ethyl, n- or iso-propyl group or the n-, sec- or tert-butyl group. These groups can be substituted for example by halogen, such as fluorine chlorine or bromine, or by OH or CN.

As a $C_1$-$C_4$-alkoxy group, $R_1$ is a straight-chain or branched-chain alkoxy group, such as the methoxy, ethoxy, n- and iso-propoxy group or the n- and iso-butoxy group. These groups can be substituted for example by $C_1$-$C_4$-alkoxy, halogen, OH or CN.

In preferred disazo compounds, $R_1$ is hydrogen.

X as a $-(CH_2)_y-$ group, wherein y is a number from 1 to 4, is either a straight-chain or branched-chain alkylene group. It is for example the $-CH_2$, $-CH_2.CH_2$, $-CH_2.CH_2.CH_2$, $-CH_2-CH(CH_3).CH_2$ or $-CH_2.CH_2.CH_2.CH_2$ group.

When X is a heterocyclic group, it is both a 5- and a 6-membered ring system, which can contain as a hetero atom: nitrogen, sulfur or oxygen. Mentioned in particular are the thiophene, pyrrole, furan or pyridine group.

If X is an $-NH$-alkylene-($C_1$-$C_6$)$-NH$ group, the "alkylene group" can be straight-chain or branched-chain. The following are mentiond for example: the $-NH-CH_2-NH$, $-NH-CH_2.CH_2-NH$, $-NH-CH_2.CH(CH_3)-NH$, $-NH-CH_2.CH_2.CH_2-NH$, $-NH-CH_2.CH_2.CH_2.CH_2-NH$, $-NH-CH_2.CH_2.CH(CH_3)-NH$, $-NH-CH_2.CH(CH_3).CH_2-NH$, $-NH-(CH_2)_5-NH$, $-NH-(CH_2)_6-NH$ and $-NH-CH_2.CH_2.CH(CH_3).CH_2-NH$ groups.

When X is an $-NH$-arylene-NH radical, it is for example an $-NH$-phenylene(1.4 and 1.3)$-NH$ radical or an $-NH$-naphthylene-NH radical, wherein the phenylene and naphthylene groups can be substituted, for example by a $C_1$-$C_4$-alkyl group.

Anions An are both inorganic and organic anions: they are for example the halide ion, such as the chloride, bromide or iodide ion, also the sulfate, methylsulfate, aminosulfonate, perchlorate, carbonate, bicarbonate, phosphate, phosphomolybdic, phosphotungstic, phosphotungstomolybdic, benzenesulfonate, naphthalenesulfonate, 4-chlorobenzenesulfonate, oxalate, maleate, formate, acetate, propionate, lactate, succinate, chloroacetate, tartrate, methanesulfonate or benzoate ions, or complex anions, such as those of zinc chloride double salts.

Preferred anions are the formate, acetate, lactate, chloride, bromide, phosphate, methosulfate and tartrate ions.

Particularly interesting cationic disazo compounds correspond to the formula I wherein K is the aniline group of the formula

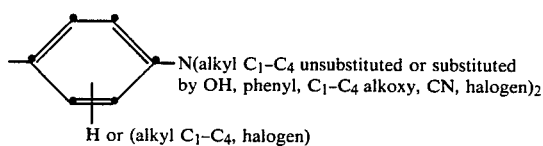

or of the formula

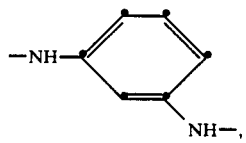

wherein the phenylene group can be substituted by $C_1$–$C_4$-alkyl; and

An is an anion.

The novel cationic disazo compounds are produced in a known manner, for example by treating a disazo compound of the formula II

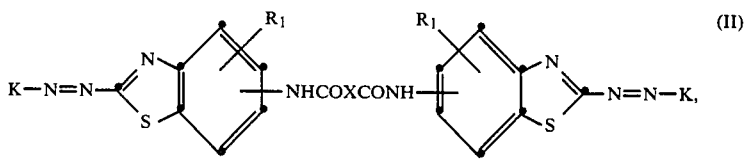

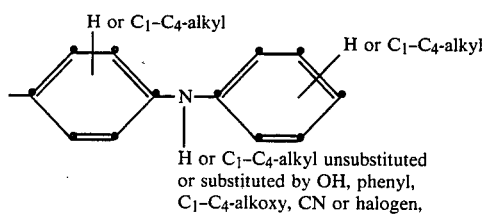

the tetrahydroquinoline radical of the formula

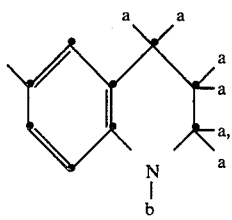

wherein the positions "a" denote hydrogen or alkyl-$C_1$–$C_4$ and "b" denotes alkyl-$C_1$–$C_4$, the indole radical or the benzomorpholine radical of the formula

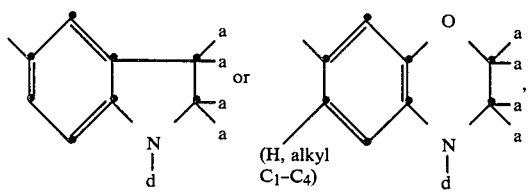

wherein the positions "a" denote hydrogen or alkyl $C_1$–$C_4$ and "d" denotes alkyl $C_1$–$C_4$ which is unsubstituted or substituted by OH;

R is a $C_1$–$C_3$-alkyl group unsubstituted or substituted by OH or $CONH_2$;

$R_1$ is hydrogen, $CH_3$ or Cl;

X is the direct bond, —$CH_2.CH_2$—, —CH=CH—, 1,3- or 1,4-phenylene, the radical of 2,5-thiophene, —NH—$(CH_2)_2$—NH—, —NH—$(CH_2)_6$—NH—, or wherein the symbols K, $R_1$ and X have the meanings defined under the formula I, with a quaternising agent introducing the "R" group.

The quaternising reaction is likewise performed in a known manner; it can be carried out for example in glacial acetic acid, or in an inert solvent such as chlorobenzene, in the presence or absence of an inorganic base, such as magnesium oxide, or optionally in an aqueous suspension, or without solvent and in an excess of the quaternizing agent, at a temperature of about 20° to 120° C.

Suitable quaternising agents introducing the "R" group are for example: alkyl halides, such as methyl or ethyl chloride, methyl, ethyl or butyl bromide, or methyl or ethyl iodide, particularly however alkyl sulfates, such as dimethyl, diethyl and dibutyl sulfate, benzyl chloride, chloroacetic acid amide, acrylic acid ester or -amide, epoxides, such as ethylene oxide, propylene oxide, epichlorohydrin and alkyl esters of aromatic sulfonic acids, such as methyl-p-toluenesulfonate, methylbenzenesulfonate, and also the propyl and butyl esters of benzenesulfonic acid.

After the quaternising reaction, the novel cationic disazo compounds of the formula I are separated from the reaction medium and dried. If desired or necessary, it is possible to exchange in these compounds the anion "An" for another anion.

The disazo compounds of the formula II are novel; these compounds are obtained for example (a) by reducing the nitro group of the benzothiazole compound of the formula III

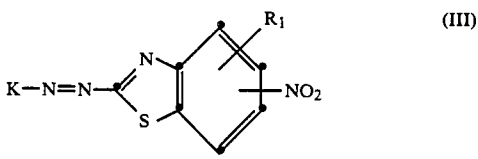

to the corresponding amino group (for example by means of sodium sulfide), or saponifying the acylamino group of the benzothiazole compound of the formula IIIa

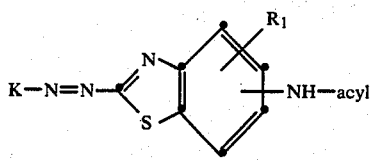

to the corresponding amino compound (for example by means of dilute $H_2SO_4$), and in each case condensing the resulting amino compound with a dicarboxylic acid halide or with a diisocyanate; in these formulae, the symbols K, $R_1$ and X have the meanings defined under the formula I; or (b) by tetrazotising a diamino compound of the formula IV

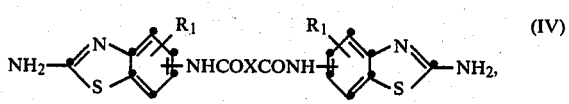

and coupling the resulting product with 2 mols of the same coupling component or with 1 mol of each of two different coupling components, the diamino compounds of the formula IV for their part being obtained by condensing for example 2 mols of the amino compound of the formula V

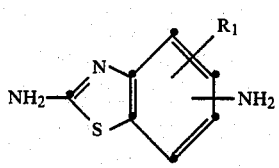

with a dicarboxylic acid halide or with a diisocyanate; or (c) by cyclising a diamino compound of the formula

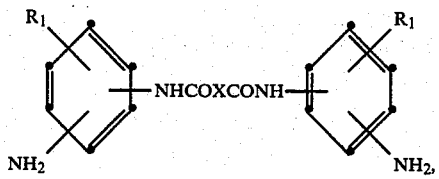

for example by means of alkali rhodanide in the presence of bromine, to the benzothiazole ring.

Suitable dicarboxylic acid halides are for example: fumaric acid dichloride, succinic acid dichloride, terephthalic acid dichloride and thiophene-2.5-dicarboxylic acid dichloride.

Mentioned as diisocyanates are for example: toluene-2.4-diisocyanate and 1.6-hexylenediisocyanate.

The disazo compounds of the formula II can be used as disperse dyes.

The novel cationic disazo compounds of the formula I are used in particular as dyes for dyeing and, with the addition of binders and optionally solvents, for printing materials dyeable with basic and cationic dyes, especially textile materials which consist, for example, advantageously of homo- or copolymers of acrylonitrile, or synthetic polyamides or polyesters modified by acid groups. Dyeing is preferably performed in an aqueous, neutral or acid medium by the exhaust process, optionally under pressure, or by the continuous process. The textile material can be in the most varied forms: for example in the form of fibres, filaments, fabrics, knitwear, piece goods and finished articles, such as shirts or pullovers.

It is possible by application of the dyes to produce level dyeings and printings which are distinguished by very good general fastness properties, especially by a very high degree of exhaustion and by good fastness to wet processing.

Furthermore, the novel disazo compounds of the formula I can be used also for dyeing and printing of natural and regenerated cellulose materials, particularly cotton and viscose, in which cases there are likewise obtained deeply coloured dyeings.

The novel disazo compounds of the formula I have on these textile materials good substantivity and a high degree of exhaustion, and the dyeings obtained have very good fastness properties, especially very good fastness to wet processing.

The novel disazo compounds of the invention can moreover by used for dyeing polyacrylonitrile materials in the spinning solution, and for dyeing polyacrylonitrile wet tow. They can also be used for stamping inks and in jet printing.

A further preferred use of the novel disazo compounds of the formula I, and also of such compounds of the formula I wherein the coupling component K is a dimethylaminophenyl group, and the divalent bridge member X is the $-(CH_2)_2$ group, is for the dyeing of paper of all types, particularly bleached, unsized and sized, lignin-free paper. These compounds are more especially suitable for dyeing unsized paper (tissues) by virtue of their very high affinity for this substrate.

The novel disazo compounds of the formula I exhaust very well onto these substrates, the waste liquors being left colourless, a factor which is of great ecological advantage, particularly in view of the present-day effluent laws.

The dyeings obtained have very good fastness to light and to wet processing, that is to say, they exhibit no tendency to bleed when dyed paper in the wet state is brought into contact with moist white paper. This property is especially desirable for so-called "tissues", in the case of which it is foreseeable that the dyed paper in the wet condition (for example soaked with water, alcohol, tenside solution, and so forth) will come into contact with other surfaces, such as with those of textiles, paper, and the like), which have to be protected from becoming contaminated.

The high affinity for paper and the high rate of exhaustion of the novel dyes are of great advantage in the continuous dyeing of paper, and thus render possible a much wider field of application of this known economical process.

Finally, the novel disazo compounds of the invention can be used also for dyeing leather (by for example spraying, brushing and dipping), and for the preparation of inks.

The following Examples further illustrate the invention without the scope thereof being limited by them. Except where otherwise stated, 'parts' are parts by weight.

EXAMPLE 1

8.2 parts of 2,5-thiophenedicarboxylic acid-N,N'-bis[2,{4'-(N-ethyl-N-hydroxyethyl)-aminophenylazo}benzothiazol-6-yl]amide, 7.6 parts of acrylamide, 80 parts by volume of glacial acetic acid and 3.5 parts by volume of concentrated hydrochloric acid are slowly heated to 95°-100° C., and the mixture is stirred at this temperature for 1 hour. The mixture is concentrated under vacuum; the residue is then dissolved in hot water, and, after filtration of the solution, the dye is salted out from the filtrate. The precipitated dye of the formula 150 parts of n-butyl alcohol. The suspension is filtered off, and the filter cake is washed with butyl alcohol and finally dried to thus obtain 2,5-thiophenedicarboxylic acid-N,N'-bis-[2-{4'-(N-ethyl-N-hydroxyethyl)-aminophenylazo}-benzothiazol-6-yl]amide as starting substance.

EXAMPLE 2

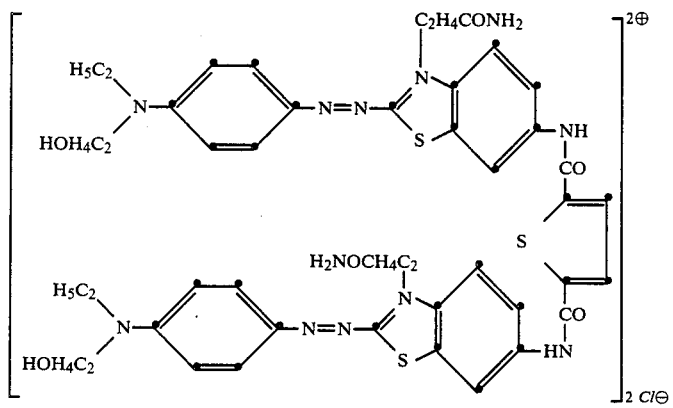

is filtered off, washed with 10% aqueous sodium chloride solution and dried. From an aqueous solution, it dyes paper pulp in blue shades, the waste liquor being left virtually colourless.

The starting substance, 2,5-thiophenedicarboxylic acid-N,N'-bis[2,{4'-(N-ethyl-N-hydroxyethyl)-aminophenylazo}benzothiazole-6-yl]amide, is obtained as follows:

37 parts of 2-[4'-(N-ethyl-N-hydroxyethyl)-aminophenylazo]-6-nitrobenzothiazole are stirred into 200 parts by volume of methyl alcohol, and 34 parts of sodium hydrogen sulfide are added portionwise. After 2 hours' subsequent stirring, the starting substance is no longer detectable in the thin-layer chromatogram. The mixture is filtered off, and the filter cake is washed with methyl alcohol and then with water. (The substance used for the above reduction is produced by a known process, for example by the coupling of diazotised 2-amino-6-nitrobenzothiazole with N-ethyl-N-hydroxyethylaniline).

6.82 parts of the reduction product thus obtained and dried are dissolved in 50 parts of N-methylpyrrolidone, and to this solution are added 2.09 parts of thiophene-2,5-dicarboxylic acid chloride. The mixture is subsequently stirred for 18 hours at room temperature, and is then poured into water. The product which has precipitated is filtered off, washed with water and stirred into 8.2 parts of hexamethylene-1,6-diamino-N,N'-biscarboxylic acid-N'',N'''-bis[2,{4'-diethylaminophenylazo} benzothiazol-6-yl] are stirred into 80 parts of glacial acetic acid, and there are then added dropwise 10 parts of propylene oxide. The mixture is heated to 60°-65°, and is stirred at this temperature for 5 hours. It is subsequently concentrated in vacuo, and the residue is dissolved in hot water and filtered until clear. The solution contains the dye of the formula

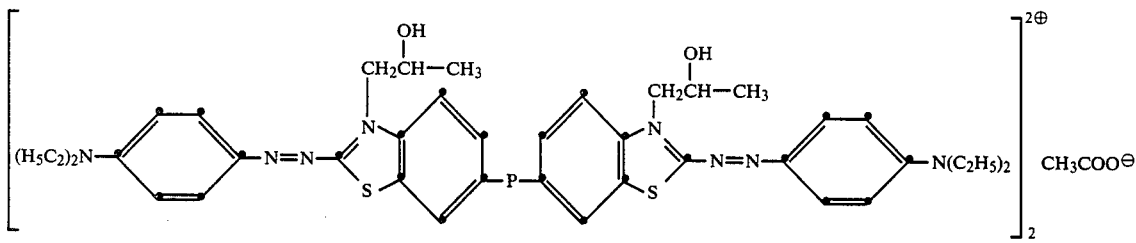

P=NHCONH(CH$_2$)$_6$NHCONH which dyes paper pulp in blue shades. The waste liquor is practically colourless.

The starting material for the above quaternisation is obtained as follows:

6.5 parts of 2-[4'-diethylaminophenylazo]-6-aminobenzothiazole, 1.7 parts of hexamethylene-1,6-diisocyanate and 25 parts of N-methylpyrrolidone are heated to 100° C., and the mixture is held at this temperature for 4 hours. After completion of the condensation reaction (visible in the thin-layer chromatogram), the mixture is cooled and is then poured into water. The product (starting substance) which has precipitated is filtered off, washed with water and dried.

The following Table illustrates further dyes which can be produced by a procedure analogous to that described in Example 1 or 2.

TABLE

| Ex. | Bridge position —NHCOXCONH— | X | R₁ | K | R | An | Shade on paper |
|---|---|---|---|---|---|---|---|
| 3 | 6,6' | $-CH_2CH_2-$ | H | 4-$N(CH_3)_2$-phenyl | $-CH_2-CHCH_3$ \| $OH$ | acetate | blue |
| 4 | 6,6' | $-CH=CH-$ | H | 4-$N(C_2H_5)_2$-phenyl | $-C_2H_4CONH_2$ | chloride | blue |
| 5 | 6,6' | 1,4-phenylene | H | 4-$N(CH_3)(C_2H_4OH)$-phenyl | $-C_2H_4CONH_2$ | chloride | blue |
| 6 | 6,6' | 2,5-thienylene | H | 4-$N(C_2H_5)(C_2H_4OH)$-phenyl | $-CH_2CH-CH_3$ \| $OH$ | acetate | blue |
| 7 | 6,6' | $-CH_2CH_2-$ | 5,5'-$CH_3$ | 4-$N(C_2H_5)(CH_2CH(OH)CH_3)$-phenyl | $-CH_3$ | metho-sulfate | blue |
| 8 | 6,6' | $-NHCH_2CH_2NH-$ | H | 4-$N(C_2H_4OH)_2$-phenyl | $-C_2H_4CONH_2$ | chloride | blue |
| 9 | 5,5' | 1,4-phenylene | H | 4-$N(C_2H_5)(CH_2C_6H_5)$-phenyl | $-C_2H_4CONH_2$ | lactate | blue |
| 10 | 6,6' | 4-methyl-1,3-phenylenediamino ($-NH-$C₆H₃(CH₃)$-NH-$) | H | 4-$N(C_2H_4OCH_3)_2$-phenyl | $-CH_2CH_2OH$ | formate | blue |
| 11 | 6,6' | $-CH=CH-$ | H | 4-$N(C_2H_5)_2$-3-$CH_3$-phenyl | $-C_2H_4CONH_2$ | phosphate | blue |
| 12 | 6,6' | $-CH_2CH_2-$ | 5,5'-Cl | 4-$N(C_2H_4OH)_2$-3-$CH_3$-phenyl | $-C_2H_4CONH_2$ | chloride | blue |
| 13 | 6,6' | 2,5-thienylene | H | 4-$N(C_2H_5)(C_2H_4OH)$-3-$CH_3$-phenyl | $-CH_2-CH-CH_3$ \| $OH$ | acetate | blue |
| 14 | 6,6' | $-NH(CH_2)_6NH-$ | H | 4-$N(CH_3)_2$-3-Cl-phenyl | $-CH_2CH_2OH$ | acetate | blue |

TABLE-continued $$\left[ K-N=N-\underset{S}{\overset{R}{\underset{N}{\bigcirc}}}\underset{7}{\overset{4}{\underset{6}{\bigcirc}}}\overset{R_1}{\underset{5}{-}}NHCOXCONH-\underset{6'}{\overset{5'}{\underset{7'}{\bigcirc}}}\overset{R_1}{\underset{4'}{\bigcirc}}\underset{S}{\overset{R}{\underset{N}{\bigcirc}}}-N=N-K \right]^{2\oplus} 2\,An^{\ominus}$$

| Ex. | Bridge position —NHCOXCONH— | X | R₁ | K | R | An | Shade on paper |
|---|---|---|---|---|---|---|---|
| 15 | 6,6' | (phenylene) | H | N(CH₂-phenyl)(C₂H₅) | —CH₂CH₂OH | lactate | greenish blue |
| 16 | 6,6' | —CH=CH— | H | 2,2,4-trimethyl-1-methyl-tetrahydroquinoline | —CH₂—CH(OH)—CH₃ | acetate | greenish blue |
| 17 | 6,6' | —CH₂CH₂— | H | N-ethyl(C₂H₄OH) aniline | —C₂H₄CONH₂ | bromide | greenish-blue |
| 18 | 6,6' | —CH=CH— | 5,5'-CH₃ | N-CH₃, N-C₂H₅ aniline | —CH₂CH(OH)—CH₃ | tartrate | greenish-blue |
| 19 | 6,6' | —CH=CH— | H | morpholino-phenyl, N-C₂H₅ | —CH₂CH(OH)—CH₃ | acetate | greenish-blue |
| 20 | 6,6' | —CH₂CH₂— | 5,5'-Cl | morpholino-methyl substituted, N-C₂H₄OH | —CH₂CH(OH)—CH₃ | formate | greenish-blue |
| 21 | 6,6' | —CH₂CH₂— | H | N-methyl diphenylamine | —C₂H₄CONH₂ | chloride | greenish-blue |
| 22 | 6,6' | —CH=CH— | H | N-(C₂H₄OH) diphenylamine | —CH₂CH(OH)—CH₃ | acetate | greenish blue |
| 23 | 6,6' | direct linkage | H | N-C₂H₅ diphenylamine | —CH₂CH(OH)—CH₃ | acetate | blue |

EXAMPLE 24

50 parts of chemically bleached beech sulfite are mixed with 50 parts of bleached RKN 15 (freeness value 22° SR) and 2 parts of the dye according to Example 1 in water (pH 6, water hardness 10° dH, temperature 20° C., ratio of goods to liquor 1:40). After 15 minutes' stirring, paper sheets are produced on a Frank sheet-former.

The paper has been dyed in a very intense blue shade, and the waste liquor is completely colourless. The degree of exhaustion attained is practically 100%. The fastness to wet processing and fastness to light are excellent.

EXAMPLE 25

A paper web is produced from bleached beech sulfite (22° SR) on a continuously operating laboratory papermaking machine. Ten seconds before the breastbox, an aqueous solution of the dye according to Example 1 is fed continuously, with intense turbulence, into the fibre suspension (0.5% dyeing, ratio of goods to liquor 1:400, water hardness 10° dH, pH 6, temperature 20° C.).

There is imparted to the paper web a deeply coloured blue shade of medium intensity, the waste liquor being left completely colourless.

EXAMPLE 26

10 parts of cotton fabric (bleached mercerised cotton) are dyed, in a laboratory beam dyeing machine, in 200 parts of a liquor (water hardness 10°, pH 4, three circulations of the dye liquor per minute) containing 0.05 part of the dye according to Example 1. The temperature is raised in 60 minutes from 20° to 100° C., and is then held constant for 15 minutes. The dye liquor is fully exhausted. There is imparted to the cotton fabric a deeply coloured blue dyeing which is distinguished by good fastness to light, and by very good fastness to wet processing.

When the same procedure is used to dye a textile fabric made from regenerated cellulose (viscose), there is obtained on this material, with the dye of Example 1, a deeply coloured blue dyeing having good fastness to light and very good fastness to wet processing.

What is claimed is:

1. A cationic disazo compound of the formula

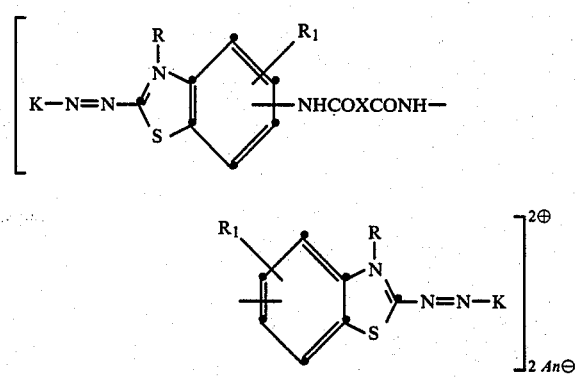

each K independent of the other is the radical of an acetic acid anilide, phenol, tetrahydroquinoline, benzomorpholine, pyridone, quinolone, pyrazolone, aminopyrazole, indole, aniline, aminopyridine, naphthol, naphtholcarboxylic acid anilide, naphthylamine, aminothiazole or thiophene coupling component, each R independent of the other is $C_1$-$C_4$-alkyl which is unsubstituted or substituted by hydroxyl, halogen, $CONH_2$ or phenyl, each $R_1$ independently of the other is (1) hydrogen, (2) halogen, (3) $C_1$-$C_4$-alkyl which is unsubstituted or substituted by hydroxyl, halogen, or cyano, or (4) $C_1$-$C_4$-alkoxy which is unsubstituted or substituted by hydroxyl, halogen, cyano or $C_1$-$C_4$-alkoxy, X is a direct bond, —($CH_2$—$)_y$ wherein y is an integer of 1 to 4, —CH=CH—, phenylene, naphthylene, a five or six membered divalent heterocyclic ring containing as a hetero atom, nitrogen, sulfur or oxygen, —NH—($C_1$-$C_6$)alkylene-NH— or —NH-arylene-NH— and An is an anion, with the proviso that when K is dimethylaminophenyl, X is not —($CH_2$)$_2$—.

2. A cationic disazo compound according to claim 1, wherein each K has the same meaning as the other K, each R has the same meaning as the other R, and each $R_1$ has the same meaning as the other $R_1$.

3. A cationic disazo compound according to claim 1, wherein the —NHCOXCONH— bridge is in the p-position with respect to the N atom of the benzothiazole, and X in the case of phenylene is 1,3- or 1,4-phenylene.

4. A cationic disazo compound according to claim 1, wherein K is the radical of an aniline, tetrahydroquinoline, benzomorpholine or indoline coupling component.

5. A cationic disazo compound according to claim 1, wherein R is —$C_2H_4CONH_2$, —$CH_2.CHOH.CH_3$, —$C_2H_4OH$ or —$CH_3$.

6. A cationic disazo compound according to claim 1, wherein $R_1$ is hydrogen.

7. A cationic disazo compound according to claim 1 wherein

K is of the formula

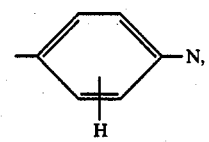

(alkyl-$C_1$-$C_4$ unsubstituted or substituted by OH, phenyl, $C_1$-$C_4$-alkoxy, CN, halogen)$_2$ or the formula

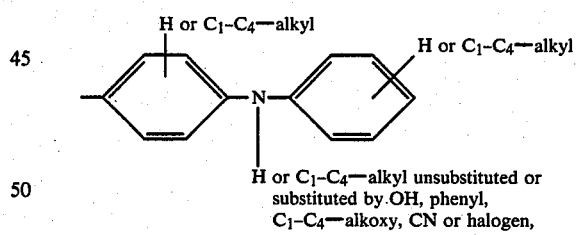

H or $C_1$-$C_4$—alkyl unsubstituted or substituted by OH, phenyl, $C_1$-$C_4$—alkoxy, CN or halogen, the tetrahydroquinoline radical of the formula

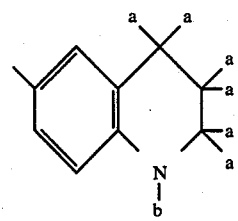

wherein the positions "a" denote hydrogen or alkyl-$C_1$-$C_4$ and "b" denotes alkyl-$C_1$-$C_4$, the indole radical of the formula the benzomorpholine radical of the formula

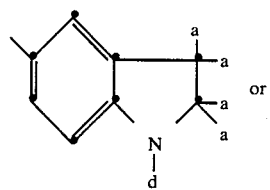 or 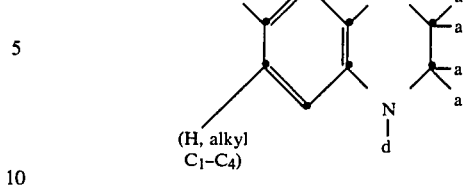

wherein the positions "a" denote hydrogen or alkyl-$C_1$-$C_4$ and "d" denotes alkyl-$C_1$-$C_4$ which is unsubstituted or substituted by OH;

R is $C_1$-$C_3$-alkyl unsubstituted or substituted by OH or $CONH_2$;

$R_1$ is hydrogen, $CH_3$ or Cl;

X is the direct bond, —$CH_2.CH_2$—, —CH=CH—, 1,3- or 1,4-phenylene which is unsubstituted or substituted by $C_1$-$C_4$-alkyl, 2,5-thiophene, —NH—$(CH_2)_2$—NH—, —NH—$(CH_2)_6$—NH—, or

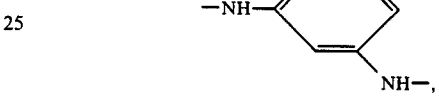

and

An is an anion.

* * * * *